(12) United States Patent
Yin et al.

(10) Patent No.: US 10,348,167 B2
(45) Date of Patent: Jul. 9, 2019

(54) CEILING FAN MOTOR

(71) Applicant: Sunonwealth Electric Machine Industry Co., Ltd., Kaohsiung (TW)

(72) Inventors: Tso-Kuo Yin, Kaohsiung (TW); Duo-Nian Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 474 days.

(21) Appl. No.: 14/980,163

(22) Filed: Dec. 28, 2015

(65) Prior Publication Data

US 2016/0211728 A1    Jul. 21, 2016

(30) Foreign Application Priority Data

Jan. 19, 2015 (TW) .............................. 104101692 A (51) Int. Cl.
| | |
|---|---|
| *H02K 11/00* | (2016.01) |
| *H02K 11/30* | (2016.01) |
| *F04D 25/06* | (2006.01) |
| *F04D 25/08* | (2006.01) |
| *H02K 21/16* | (2006.01) |
| *H02K 21/22* | (2006.01) |
| *H02K 11/33* | (2016.01) |
| *H02K 5/04* | (2006.01) |

(52) U.S. Cl.
CPC ............ *H02K 11/30* (2016.01); *F04D 25/068* (2013.01); *F04D 25/088* (2013.01); *H02K 5/04* (2013.01); *H02K 11/33* (2016.01); *H02K 21/16* (2013.01); *H02K 21/22* (2013.01)

(58) Field of Classification Search
CPC ........................................................ H02K 9/06
USPC .............................................. 310/67 R, 68 R
See application file for complete search history.

(56) References Cited

U.S. PATENT DOCUMENTS

| | | | | |
|---|---|---|---|---|
| 4,554,473 A | * | 11/1985 | Muller | H02K 29/08 310/64 |
| 6,236,126 B1 | * | 5/2001 | Yagi | H02K 1/2786 310/156.26 |
| 6,333,576 B1 | * | 12/2001 | Ishikawa | H02K 1/187 310/67 R |
| 6,617,719 B2 | * | 9/2003 | Sunaga | H02K 3/50 310/64 |
| 6,762,521 B2 | * | 7/2004 | Peter | H02K 1/187 310/43 |

(Continued)

FOREIGN PATENT DOCUMENTS

| | | |
|---|---|---|
| CN | 203707931 U | 7/2014 |
| CN | 203939762 U | 11/2014 |

(Continued)

*Primary Examiner* — Alexander Talpalatski
(74) *Attorney, Agent, or Firm* — Alan D. Kamrath; Mayer & Williams PC (57) ABSTRACT

A ceiling fan motor with a reduced height includes a stator, a rotor and a circuit unit. The stator includes an iron core and a shaft. The iron core has an assembly hole, and the shaft extends through the assembly hole in an extending direction. The rotor is rotatably coupled with an outer periphery of the shaft. The circuit unit is arranged between the iron core and the shaft in a radial direction of the shaft perpendicular to the extending direction of the shaft, or is arranged between the iron core and the housing of the rotor in the radial direction of the shaft.

11 Claims, 8 Drawing Sheets

(56) References Cited

U.S. PATENT DOCUMENTS

| | | | |
|---|---|---|---|
| 6,831,382 B1* | 12/2004 | Lyle | H02K 5/04 310/12.13 |
| 7,498,762 B2* | 3/2009 | Takada | H02K 1/2786 310/43 |
| 7,728,476 B2* | 6/2010 | Yano | H02K 5/10 310/67 R |
| 8,253,285 B2* | 8/2012 | Yoshida | H02K 5/20 310/216.115 |
| 8,303,274 B2* | 11/2012 | Winkler | F04D 25/0633 310/68 B |
| 8,836,188 B2* | 9/2014 | Su | H02K 9/06 310/406 |
| 9,379,581 B2 | 6/2016 | Busch | |
| 9,712,003 B2* | 7/2017 | Yin | H02K 1/187 |
| 2007/0103101 A1* | 5/2007 | Kikuchi | H02K 11/048 318/140 |
| 2011/0012446 A1* | 1/2011 | Maute | H02K 5/10 310/50 |
| 2015/0176602 A1 | 6/2015 | Horng | |
| 2015/0180290 A1* | 6/2015 | Yin | H02K 1/187 310/91 |
| 2015/0333592 A1 | 11/2015 | Yin et al. | |
| 2016/0211728 A1 | 7/2016 | Yin et al. | |

FOREIGN PATENT DOCUMENTS

| | | |
|---|---|---|
| CN | 204481644 U | 7/2015 |
| DE | 102007001733 A1 | 7/2008 |
| DE | 102012217363 A1 | 4/2014 |
| EP | 2068427 A2 | 6/2009 |
| EP | 2466147 A1 | 6/2012 |
| JP | S61147762 A | 7/1986 |
| JP | H0678506 A | 3/1994 |
| JP | 2012041867 A | 3/2012 |
| TW | M354002 U | 4/2009 |

* cited by examiner

CEILING FAN MOTOR

CROSS REFERENCE TO RELATED APPLICATIONS

The application claims the benefit of Taiwan application serial No. 104101692, filed on Jan. 19, 2015, and the subject matter of which is incorporated herein by reference.

BACKGROUND OF THE INVENTION

1. Field of the Invention

The present invention generally relates to a ceiling fan motor and, more particularly, to a ceiling fan motor with a reduced height.

2. Description of the Related Art

Figure 1:
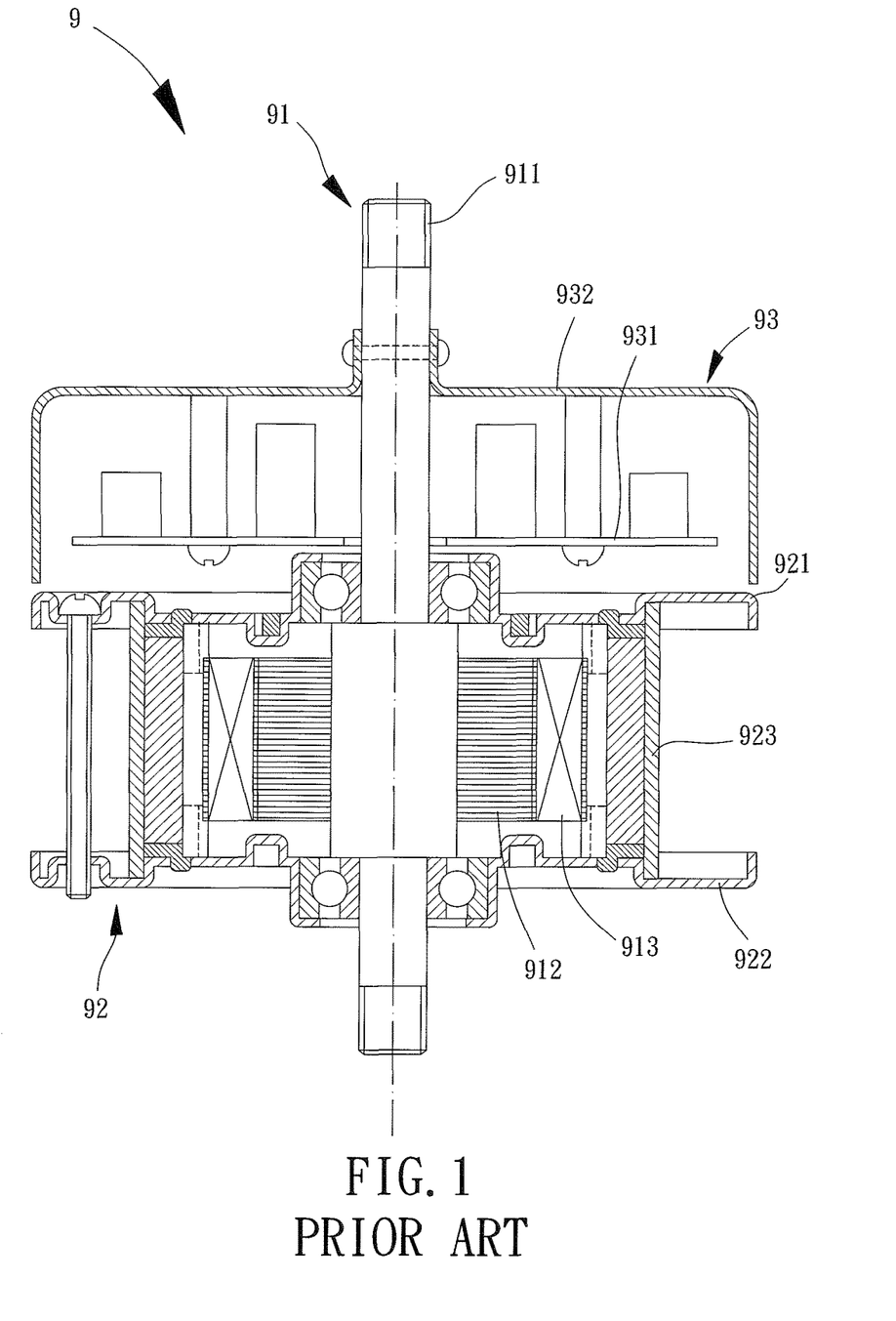
FIG. 1 is a cross sectional view of a conventional ceiling fan motor.

FIG. 1 shows a conventional ceiling fan motor 9 having a stator 91, a rotor 92 and a control unit 93. The stator 91 includes a shaft 911, an iron core 912 fitted around the shaft 911, and a coil unit 913 wound around the iron core 912. The rotor 92 may be rotatably coupled with the shaft 911 and includes a cover plate 921, a bottom plate 922 and an intermediate portion 923 connected between the cover plate 921 and the bottom plate 922. The cover plate 921 and the bottom plate 922 are arranged on two sides of the iron core 912, respectively. The control unit 93 includes a circuit board 931 and a housing 932 for receiving the circuit board 931. As such, the housing 932 is positioned on one side of the stator 91 when the circuit board 931 is received in the housing 932. The conventional ceiling fan motor 9 can be seen in Taiwan Patent No. M354002.

In the ceiling fan motor 9, the housing 932 and the circuit board 931 are arranged outside of the stator 91 and the rotor 92. The circuit board 931 includes a plurality of electronic components (such as capacitors). Since the electronic components have certain volumes, the surface of the circuit board 931 is not flat. In light of this, the housing 932 must be in the form of a box having a compartment for receiving the circuit board 931. However, the arrangement of the housing 932 and the circuit board 931 increases the axial height (or thickness) of the ceiling fan motor 9.

If the thickness of the ceiling fan motor 9 is not reduced, it is not suitable to mount the ceiling fan motor 9 to a low ceiling, adversely lowering the utility of the ceiling fan motor 9. Therefore, it is necessary to provide a novel ceiling fan motor with improved utility.

SUMMARY OF THE INVENTION

It is therefore the objective of this invention to provide a ceiling fan motor including an iron core, a shaft, a rotor and a circuit unit. The circuit unit is arranged between the iron core and the shaft in a radial direction of the shaft perpendicular to the extending direction of the shaft, or arranged between the iron core and a housing of the rotor. As such, the height of the ceiling fan motor is reduced.

In an embodiment of the invention, a ceiling fan motor includes a stator, a rotor and a circuit unit. The stator includes an iron core and a shaft. The iron core has an assembly hole, and the shaft extends through the assembly hole in an extending direction. The rotor is rotatably coupled with an outer periphery of the shaft. The circuit unit is arranged between the iron core and the shaft in a radial direction of the shaft perpendicular to the extending direction of the shaft.

In a form shown, the circuit unit comprises a circuit board mounted with at least one electronic component, the rotor and the iron core are located within an area in the extending direction of the shaft, and the at least one electronic component of the circuit board extends into the area.

In the form shown, the iron core is coupled to a base, and the base is formed in the assembly hole. A shaft hole is arranged at a center of the base, the shaft extends through the shaft hole, and the circuit unit is arranged in the base.

In the form shown, the ceiling fan motor further includes a cover coupled with the stator. The circuit unit includes a circuit board mounted with at least one electronic component, the circuit board is coupled with the cover, and the at least one electronic component of the circuit board extends into the base.

In the form shown, the circuit board is coupled with a surface of the base.

In the form shown, the base further includes an insulating layer sandwiched between the circuit board and the base.

In the form shown, the base includes a recess extending away from the circuit unit, and the circuit unit aligns with the rotor or the iron core in the radial direction of the shaft.

In the form shown, the ceiling fan motor further includes a cover coupled with the stator, and the cover has a flat outer surface extending in the radial direction of the shaft.

In the form shown, the circuit unit includes a circuit board and a receiving portion. The circuit board is mounted with at least one electronic component, the receiving portion is arranged in the base, and the circuit board and the at least one electronic component are received in the receiving portion.

In another embodiment of the invention, a ceiling fan motor includes a stator, a rotor and a circuit unit. The stator includes an iron core and a shaft, the iron core has an assembly hole, and the shaft extends through the assembly hole in an extending direction. The rotor is rotatably coupled with an outer periphery of the shaft and has a housing. The circuit unit is arranged between the iron core and the housing in a radial direction perpendicular to the extending direction of the shaft.

In a form shown, the circuit unit includes a circuit board mounted with at least one electronic component, the rotor and the iron core are located within an area in the extending direction of the shaft, and the at least one electronic component of the circuit board extends into the area.

In the form shown, the iron core is coupled to a radial extension portion. The circuit unit is coupled with the radial extension portion, which extends from the iron core towards the housing, and the circuit unit is aligned with the rotor or the iron core in a radial direction perpendicular to the extending direction of the shaft.

In the form shown, the ceiling fan motor further includes a cover coupled with the stator, and the cover has a flat outer surface extending in a radial direction perpendicular to the extending direction of the shaft.

In the form shown, the circuit unit includes a circuit board mounted with at least one electronic component, the circuit board is coupled with the cover, and the at least one electronic component of the circuit board extends into a space between the iron core and the housing.

In the form shown, the cover has an assembly channel extending in the radial direction of the shaft, and the cover is detachably attached to the stator.

Based on the above structure, the circuit unit of each ceiling fan motor is arranged between the iron core and the shaft in the radial direction of the shaft, or arranged between the iron core and the housing of the rotor. Thus, the circuit unit can be radially aligned with the rotor or the iron core in the radial direction of the shaft. Therefore, arrangement of the circuit unit will not increase the height of the ceiling fan motor, thereby improving the utility of the ceiling fan motor.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
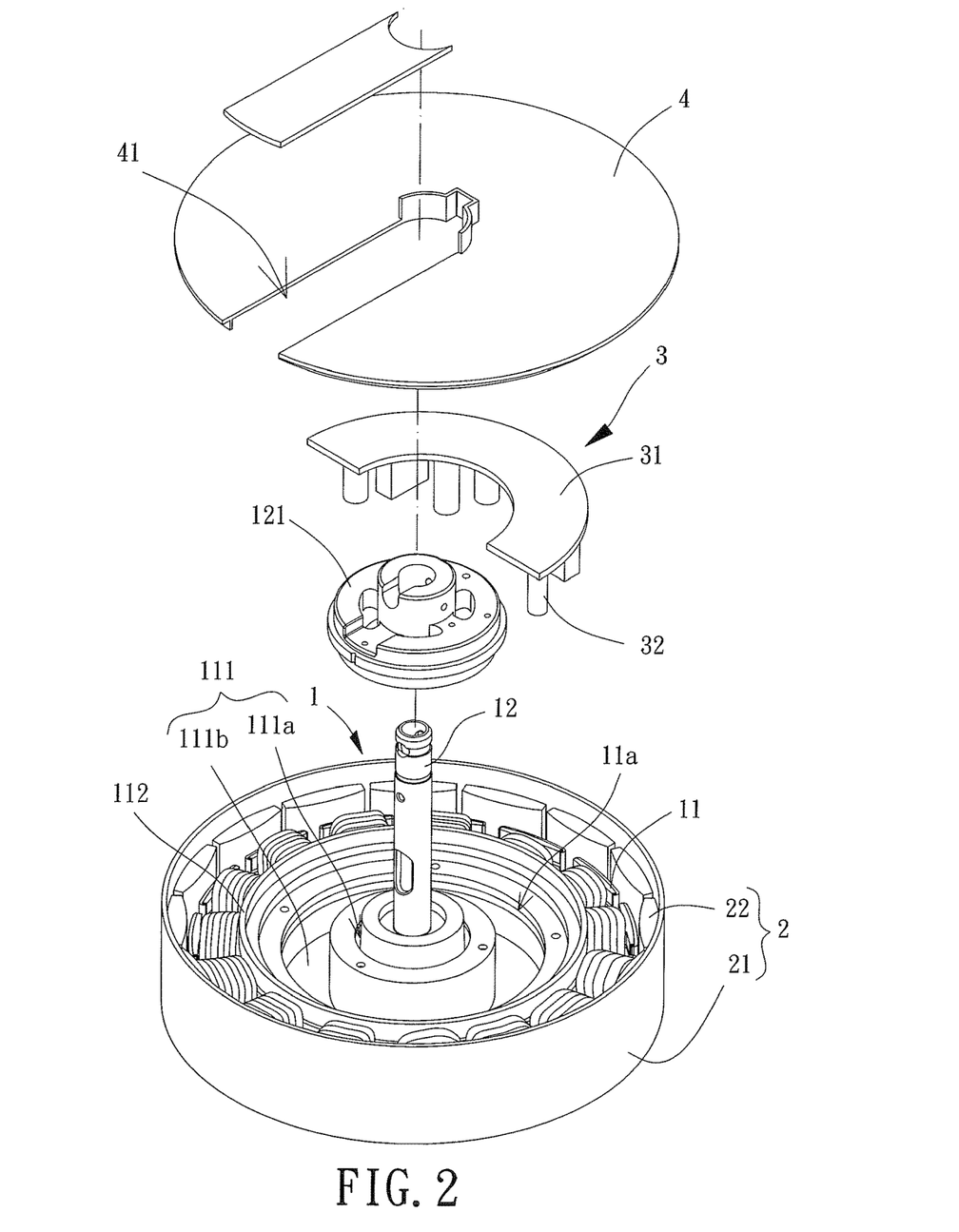
FIG. 2 is an exploded view of a ceiling fan motor according to a first embodiment of the invention.
Figure 3:
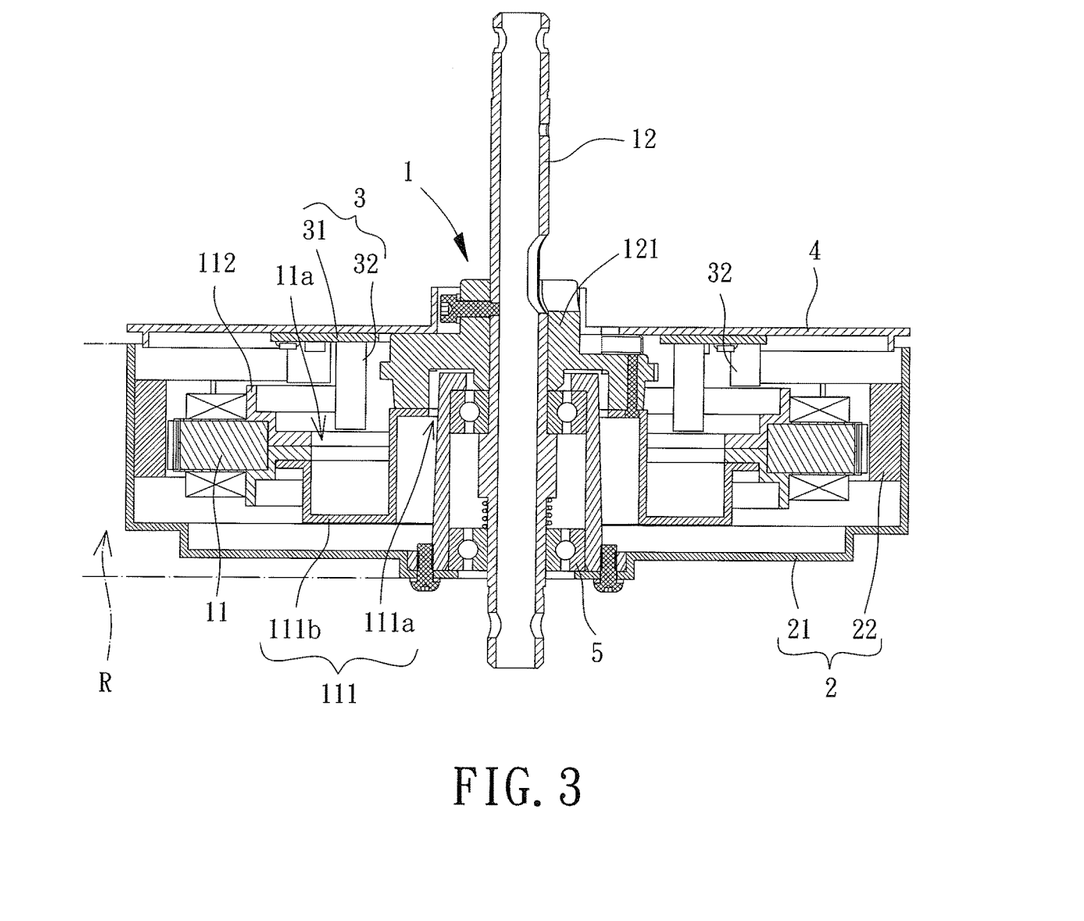
FIG. 3 is a cross sectional view of the ceiling fan motor of the first embodiment of the invention.

FIGS. 2 and 3 show a ceiling fan motor according to a first embodiment of the invention, which includes a stator 1, a rotor 2 and a circuit unit 3. The rotor 2 is rotatably coupled with the stator 1. The stator 1 includes an iron core 11 and a shaft 12. The circuit unit 3 is arranged between the iron core 11 and the shaft 12.

The iron core 11 may be formed by a plurality of silicon steel plates stacked together, or integrally formed by a magnetic conducting material. The iron core 11 includes an assembly hole 11a which is preferably located at the center of the iron core 11. The shaft 12 may extend through the assembly hole 11a and couple with the iron core 11. In the embodiment, the iron core 11 is coupled to a base 111 arranged within the diametric extent of the assembly hole 11a. A shaft hole 111a is arranged at the center of the base 111. The shaft 12 extends through the shaft hole 111a. The iron core 11 may be connected to the shaft 12 via the base 111. Alternatively, the shaft 12 is connected to a supporting member 121, such that two ends of the base 111 are respectively coupled to the iron core 11 and the supporting member 121. In this mechanism, the iron core 11 is also connected to the shaft 12 via the base 111. The base 111 may be coupled with the iron core 11 by screwing, fastening, adhesion or tenoning. The base 111 may also be integrally formed with the iron core 11. Similarly, the base 111 may also be coupled with the supporting member 121 by screwing, fastening, adhesion or tenoning.

Since the base 111 may be made of a conducting material such as metal, the iron core 11 may include a sleeve 112 that is coupled to the outer surface of the iron core 11. The sleeve 112 is made of an insulating material such as plastic. The base 111 is coupled with the sleeve 112 of the iron core 11. In this arrangement, the sleeve 112 can be wound with a coil unit while preventing short circuiting between the iron core 11 and the base 111.

The rotor 2 is rotatably coupled with the outer periphery of the shaft 12. In this embodiment, the ceiling fan motor is an outer-rotor-type motor. The rotor 2 may include a housing 21 and a permanent magnet unit 22 facing the iron core 11. The permanent magnet unit 22 may be coupled with the inner periphery of the housing 21 and is spaced from the outer periphery of the iron core 11 by an air gap.

The circuit unit 3 is arranged between the iron core 11 and the shaft 12 in a radial direction perpendicular to the extending direction of the shaft 12. In other words, the circuit unit 3 may be arranged in the base 111. Specifically, the base 111 includes a recess 111b extending away from the circuit unit 3. As such, the assembly hole 11a of the iron core 11 forms a receiving space, allowing the circuit unit 3 to be disposed into the base 111. In this arrangement, the circuit unit 3 is able to radially align with the rotor 2 or the iron core 11. The circuit unit 3 includes a circuit board 31 mounted with at least one electronic component 32. The rotor 2 and the iron core 11 are located within an axial range "R," and the electronic component(s) 32 of the circuit board 31 extends into the axial range "R."

In the embodiment, the ceiling fan motor includes a cover 4 coupled with the stator 1. The cover 4 may be coupled with the supporting member 121 to close the interior space of the ceiling fan motor. The circuit board 31 of the circuit unit 3 may be coupled with the cover 4, and the electronic component(s) 32 of the circuit board 31 is disposed into the base 111. Since the electronic component(s) 32 may be disposed in the recess 111b of the base 111, the circuit unit 3 is radially aligned with the rotor 2 or the iron core 11. In such an arrangement, the cover 4 is able to form a flat outer surface extending in the radial direction of the ceiling fan motor perpendicular to the shaft 12.

Furthermore, the cover 4 preferably includes an assembly channel 41 extending in the radial direction of the ceiling fan motor. As such, the cover 4 is in the form of a C-shaped plate having an opening. The shaft 12 may extend through the assembly channel 41, and the cover 4 may be detachably attached to the stator 1. In this arrangement, when the circuit board 31 malfunctions, one can disengage the cover 4 from the stator 1 and detach the cover 4 from the ceiling fan motor via the assembly channel 41 for replacement or maintenance of the circuit board 31. Advantageously, the utility of the ceiling fan motor is improved.

When the ceiling fan motor is in use, the shaft 12 may be fixed to a predetermined location such as the ceiling. Based on this, a bearing 5 may be coupled with the outer periphery of the shaft 12, and the rotor 2 is coupled with the outer periphery of the bearing 5. In this regard, the rotor 2 is rotatably arranged around the shaft 12. Besides, the housing 21 of the rotor 2 may be coupled with a plurality of blades (not shown) to form a ceiling fan.

Based on the above structure of the ceiling fan motor, since the circuit unit 3 is arranged between the iron core 11 and the shaft 12 in the radial direction of the ceiling fan motor, the circuit unit 3 is able to radially align with the rotor 2 or the iron core 11. In this regard, the electronic component(s) 32 on the circuit board 31 can be disposed into the area "R" at which the rotor 2 and the iron core 11 are located. Therefore, the arrangement of the circuit unit 3 will not increase the height of the ceiling fan motor.

In addition, although the ceiling fan motor includes the cover 4 with which the circuit board 31 of the circuit unit 3 is coupled, the arrangements of the circuit unit 3 and the cover 4 will not increase the height of the ceiling fan motor since the cover 4 has a flat outer surface extending in the radial direction of the shaft 12.

Figure 4:
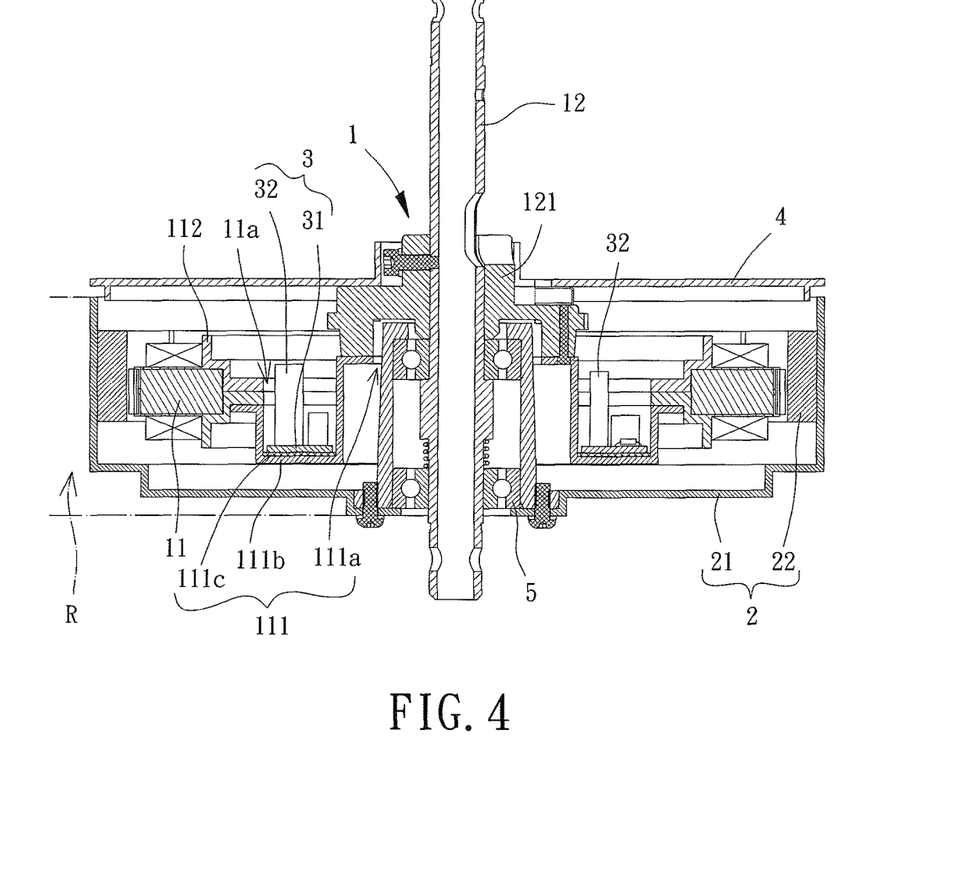
FIG. 4 is a cross sectional view of a ceiling fan motor according to a second embodiment of the invention.

Referring to FIG. 4, a ceiling fan motor is shown according to a second embodiment of the invention. The second embodiment differs from the first embodiment in that the circuit board 31 of the circuit unit 3 may be directly coupled with the surface of the base 111. Specifically, since the base 111 has the recess 111b, the circuit board 31 may abut with the bottom surface of the recess 111b, and the electronic component(s) 32 on the circuit board 31 may extend into the assembly hole 11a of the iron core 11. In this manner, the circuit unit 3 is still aligned with the rotor 2 or the iron core 11 in the radial direction of the ceiling fan motor.

Furthermore, the base 111 may be made of a conducting material such as metal. In this regard, the base 111 preferably includes an insulating layer 111c sandwiched between the circuit board 31 and the base 111. The insulating layer 111c is able to prevent short circuiting between the electronic component(s) 32 and the base 111 as well as prevent the electric current from flowing between the circuit board 31 and the iron core 11.

Figure 5:
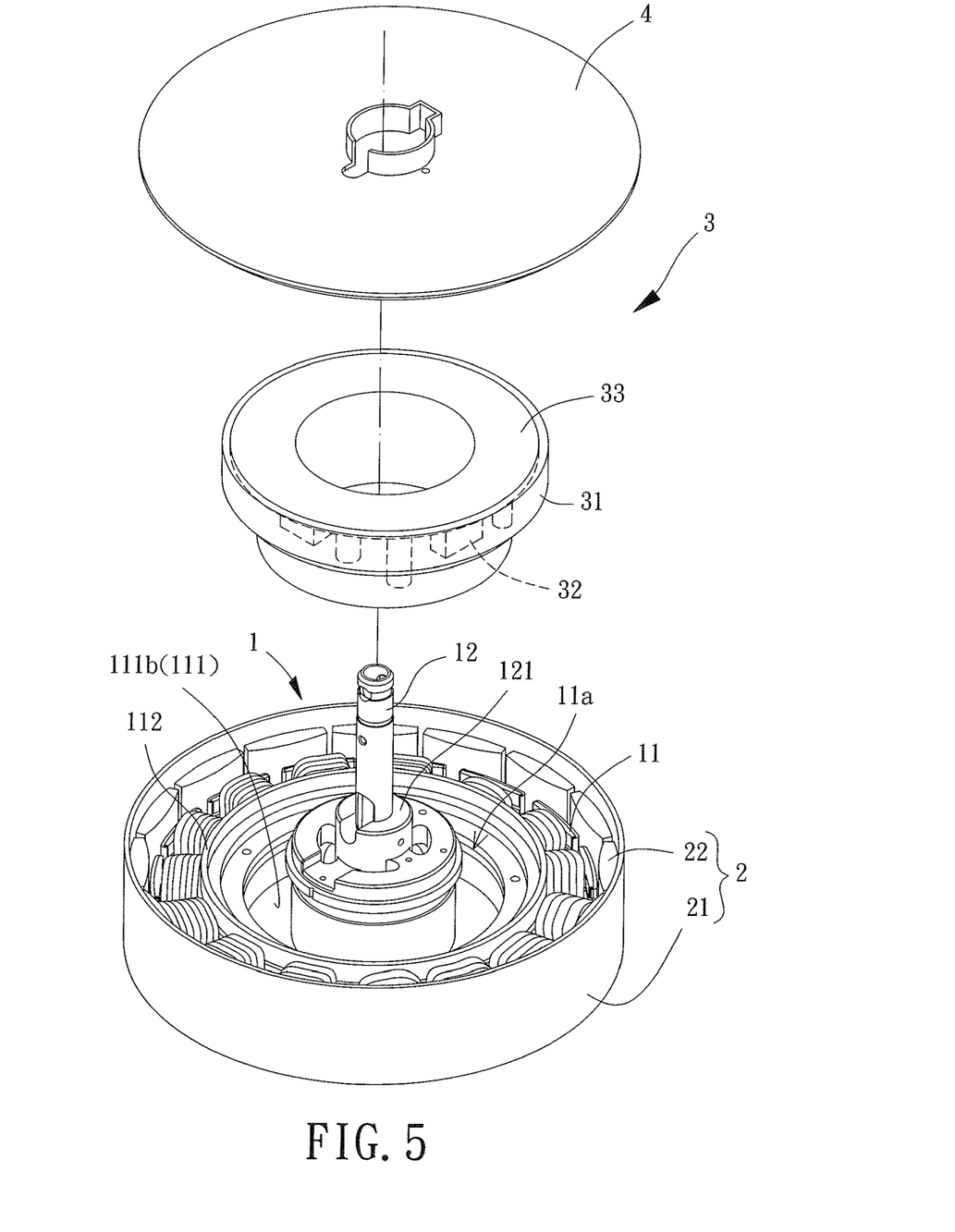
FIG. 5 is an exploded view of a ceiling fan motor according to a third embodiment of the invention.
Figure 6:
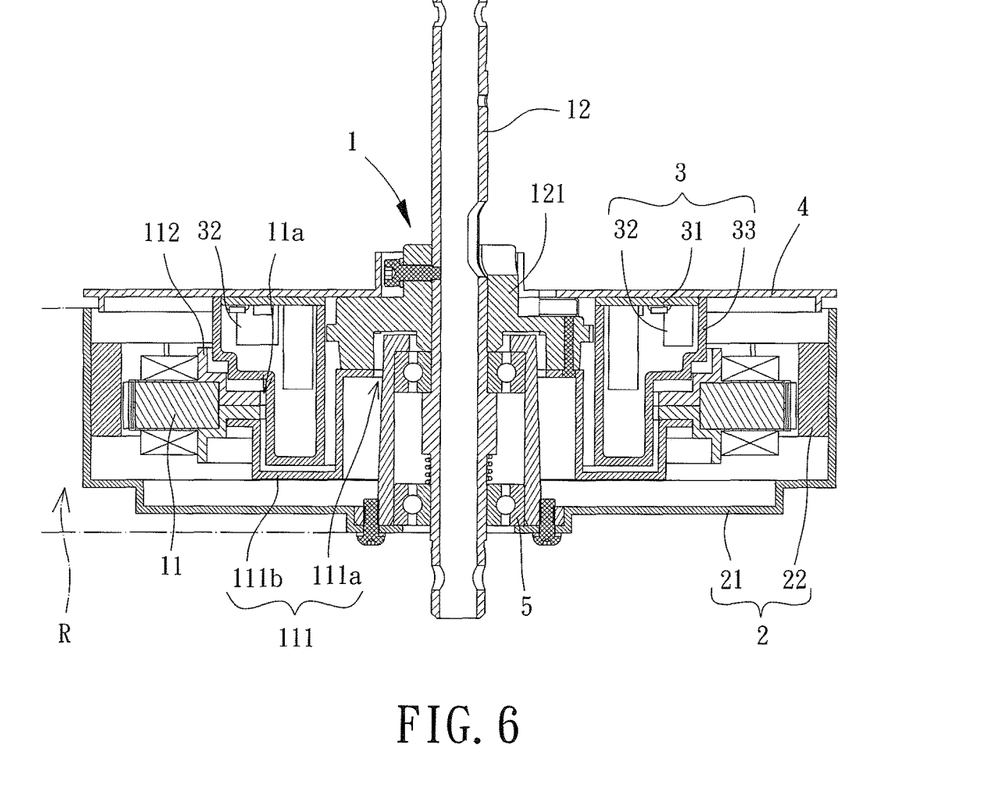
FIG. 6 is a cross sectional view of the ceiling fan motor of the third embodiment of the invention.

Referring to FIGS. 5 and 6, a ceiling fan motor is shown according to a third embodiment of the invention. The third embodiment differs from the first embodiment in that the circuit unit 3 further includes a receiving portion 33 arranged in the base 111. The circuit board 31 and its electronic component(s) 32 are received in the receiving portion 33. The receiving portion 33 may be coupled with the cover 4. Alternatively, the receiving portion 33 may also be coupled with the surface of the base 111. In addition, the receiving portion 33 is able to provide dampproof and dustproof effects, and the receiving portion 33 may be made of different materials according to the design requirements. For example, the receiving portion 33 may be made of an insulating material such as plastic, to provide an insulation effect between the circuit board 31 and the electronic component(s) 32. Alternatively, the receiving portion 33 may be made of metal to provide an electromagnetic shielding effect for the circuit board 31 and the electronic component(s) 32.

Figure 7:
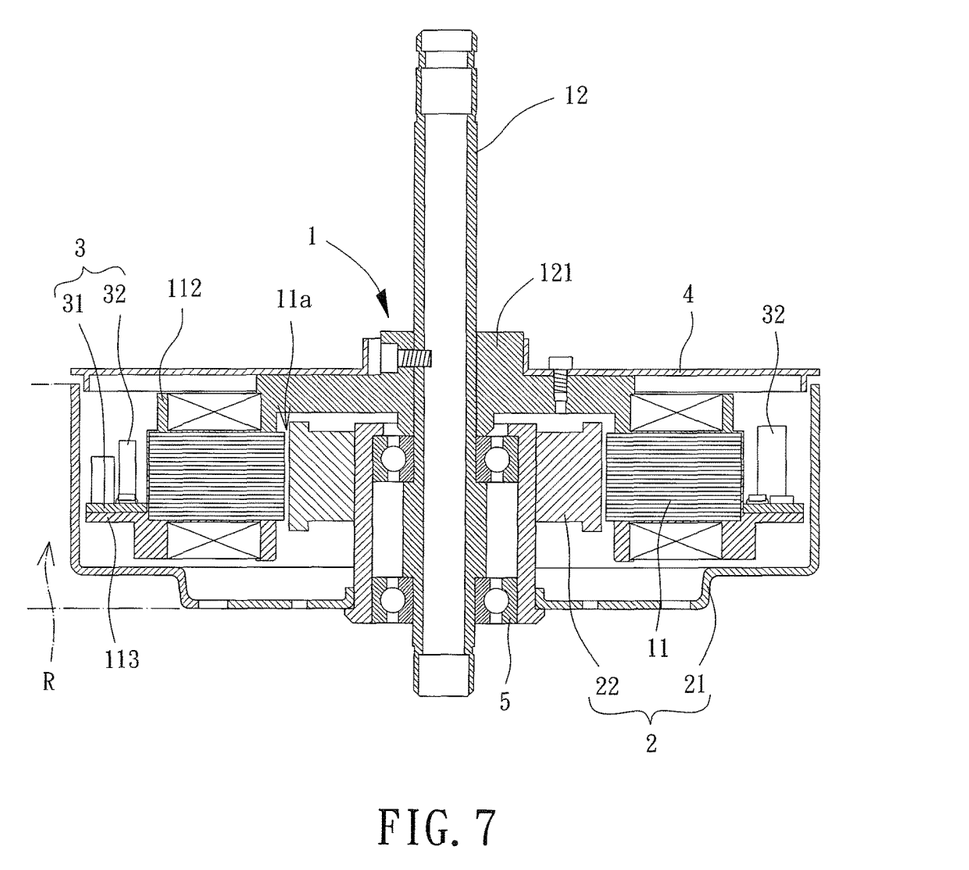
FIG. 7 is a cross sectional view of a ceiling fan motor according to a fourth embodiment of the invention.

Referring to FIG. 7, a ceiling fan motor is shown according to a fourth embodiment of the invention. Similar to the first embodiment, the ceiling fan motor in the fourth embodiment also includes a stator 1, a rotor 2 and a circuit unit 3, and the rotor 2 also includes a housing 21. In this regard, the fourth embodiment differs from the first embodiment in that the circuit unit 3 is arranged between the iron core 11 and the housing 21. In this embodiment, the ceiling fan motor is an inner-rotor-type motor. The rotor 2 may further include a permanent magnet unit 22 rotatably coupled with the shaft 12. The permanent magnet unit 22 faces the inner periphery of the iron core 11 and is spaced from the inner periphery of the iron core 11 by a spacing. A bearing 5 may be coupled with the outer periphery of the shaft 12, and the permanent magnet unit 22 is coupled to the outer periphery of the bearing 5, thus rotatably coupling the rotor 2 to the outer periphery of the shaft 12.

The circuit unit 3 is arranged between the iron core 11 and the housing 21 in the radial direction of the shaft 12. Specifically, the iron core 11 is spaced from the housing 21 by a gap, and the circuit unit 3 may be located in the gap. In this embodiment, the iron core 11 is coupled to a radial extension portion 113. The circuit unit 3 is coupled with the radial extension portion 113. The radial extension portion 113 extends from the iron core 11 towards the housing 21, so that the circuit unit 3 is aligned with the rotor 2 or the iron core 11 in the radial direction of the shaft 12. The circuit unit 3 may also include a circuit board 31 mounted with at least one electronic component 32, and the rotor 2 and the iron core 11 are located within an area "R" in the extending direction of the shaft 12. The electronic component(s) 32 of the circuit board 31 also extends into the area "R."

Based on the above structure, the circuit unit 3 in the fourth embodiment is arranged between the iron core 11 and the housing 21 in the radial direction of the shaft 12. Therefore, the circuit unit 3 can be radially aligned with the rotor 2 and the iron core 11, allowing the electronic component(s) 32 of the circuit board 31 to extend into the area "R" where the rotor 2 and the iron core 11 are located. In this manner, the arrangement of the electronic component(s) 32 will also not increase the height of the ceiling fan motor.

Moreover, the ceiling fan motor in this embodiment also includes a cover 4 coupled with the stator 1. Since the electronic component(s) 32 can extend into the recess 111b of the base 111 and since the circuit unit 3 is arranged between the iron core 11 and the housing 21, the cover 4 can have a flat outer surface in the radial direction of the shaft 12.

Figure 8:
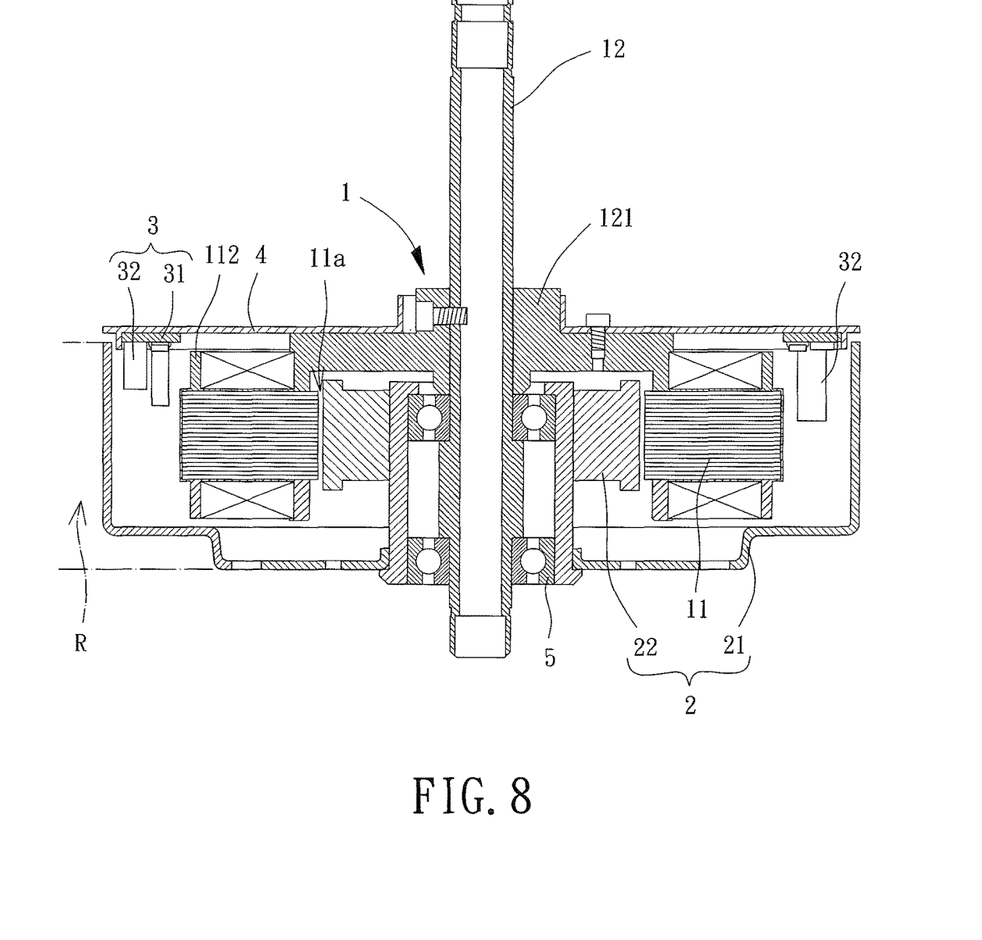
FIG. 8 is a cross sectional view of the ceiling fan motor of the fourth embodiment of the invention having a different implementation from FIG. 7.

FIG. 8 shows another implementation of the ceiling fan motor of the fourth embodiment. In the implementation, the circuit unit 3 may be coupled with the cover 4. More specifically, the iron core 11 does not need to be coupled to the radial extension portion 113, the circuit board 31 of the circuit unit 3 may be connected to the cover 4, and the electronic component(s) 32 of the circuit board 31 extends into the space between the iron core 11 and the housing 21. Since the electronic component(s) 32 extends into the space between the iron core 11 and the housing 21, the circuit unit 3 can be radially aligned with the rotor 2 or the iron core 11.

The primary features of the ceiling fan motors of the individual embodiments of the invention are summarized as below. Specifically, the circuit unit 3 can be radially aligned with the rotor 2 or the iron core 11 by arranging the circuit unit 3 between the iron core 11 and the shaft 12 in the radial direction of the shaft 12 or by arranging the circuit unit 3 between the iron core 11 and the housing 21. As such, the electronic component(s) 32 of the circuit board 31 can extend into the area "R" where the rotor 2 and the iron core 11 are located. Based on this, the arrangement of the circuit unit 3 will not increase the height of the ceiling fan motor. It can be known from the above that the ceiling fan motors of the individual embodiments of the invention can have reduced heights, thereby improving the utility of the ceiling fan motors.

Furthermore, as compared with the conventional ceiling fan motor 9 where the housing 932 must be in the form of a box in order to form a compartment for receiving the circuit board 931, the arrangement of the cover 4 of the invention will not increase the height of the ceiling fan motor since the cover 4 has a flat outer surface in the radial direction of the shaft 12. Thus, it is proven that the circuit unit 3 and the cover 4 in the individual embodiment of the invention are capable of reducing the height of the ceiling fan motor. In conclusion, the ceiling fan motors of the invention possess improved utility.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A ceiling fan motor comprising:
a stator comprising an iron core and a shaft, wherein the iron core has an assembly hole and is coupled to a base, wherein the base has an inner periphery delimiting a shaft hole, and wherein the shaft extends through the shaft hole and the assembly hole in an extending direction;
a rotor rotating about the shaft;
a bearing coupled with the rotor and an outer periphery of the shaft; and
a circuit unit arranged between the iron core and the shaft in a radial direction of the shaft perpendicular to the extending direction of the shaft,
wherein the rotor includes a housing delimiting a compartment, and wherein the base, the stator and the circuit unit are received in the compartment,
wherein the base comprises a recess extending away from the circuit unit, wherein the iron core and the shaft are disposed outside the recess of the base, wherein the iron core is radially between the housing of the rotor and the base, wherein the base is radially between the iron core and the shaft, and wherein the shaft is non-rotatable.

2. The ceiling fan motor as claimed in claim 1, wherein the circuit unit comprises a circuit board mounted with at least one electronic component, wherein the rotor and the iron core are located within an area in the extending direction of the shaft, and wherein the at least one electronic component of the circuit board extends into the area.

3. The ceiling fan motor as claimed in claim 1, wherein the base is formed in the assembly hole, wherein the shaft hole is arranged at a center of the base, and wherein the circuit unit is arranged in the base.

4. The ceiling fan motor as claimed in claim 3, further comprising a cover coupled with the stator, wherein the circuit unit comprises a circuit board mounted with at least one electronic component, wherein the circuit board is coupled with the cover, and wherein the at least one electronic component of the circuit board extends into the recess of the base.

5. The ceiling fan motor as claimed in claim 3, wherein the circuit board is coupled with a surface of the base.

6. The ceiling fan motor as claimed in claim 5, wherein the base further comprises an insulating layer sandwiched between the circuit board and the base.

7. The ceiling fan motor as claimed in claim 3, wherein the circuit unit aligns with the rotor or the iron core in the radial direction of the shaft.

8. The ceiling fan motor as claimed in claim 1, further comprising a cover coupled with the stator, wherein the cover has a flat outer surface extending in the radial direction of the shaft.

9. The ceiling fan motor as claimed in claim 3, wherein the circuit unit comprises a circuit board and a receiving portion, wherein the circuit board is mounted with at least one electronic component, wherein the receiving portion is arranged in the base, and wherein the circuit board and the at least one electronic component are received in the receiving portion.

10. The ceiling fan motor as claimed in claim 8, wherein the cover has an assembly channel extending through the cover from an inner edge of the cover to an outer edge of the cover in the radial direction of the shaft, and wherein the cover is detachably attached to the stator.

11. The ceiling fan motor as claimed in claim 7, wherein an entirety of the circuit unit is located in the recess of the base and between the iron core and the shaft in the radial direction of the shaft.

* * * * *